US005497836A

United States Patent [19]
Groff

[11] Patent Number: 5,497,836
[45] Date of Patent: Mar. 12, 1996

[54] ROW CLEANER

[76] Inventor: Jerry L. Groff, 1320 Wellington, Imperial, Nebr. 69033

[21] Appl. No.: 210,048

[22] Filed: Mar. 17, 1994

[51] Int. Cl.$^6$ ..................................................... A01B 21/02
[52] U.S. Cl. .......................... 172/555; 172/574; 172/604; 172/770; 172/771
[58] Field of Search ...................................... 172/540, 555, 172/574, 575, 604, 770, 771, 177, 166; 111/167

[56] References Cited

U.S. PATENT DOCUMENTS

| | | | |
|---|---|---|---|
| 1,699,151 | 1/1929 | Miller et al. | 172/540 |
| 2,575,321 | 11/1951 | Traver | 172/555 |
| 3,766,988 | 10/1973 | Whitesides | 172/555 X |
| 4,425,973 | 1/1984 | Williams et al. | 172/574 |
| 4,483,401 | 11/1984 | Robertson | 172/574 |
| 4,785,890 | 11/1988 | Martin | 172/29 |
| 4,991,660 | 2/1991 | Horváth et al. | 172/540 X |
| 5,129,282 | 7/1992 | Bassett et al. | 74/529 |
| 5,299,647 | 4/1994 | Mudd et al. | 172/540 X |
| 5,346,020 | 9/1994 | Bassett | 172/540 |

FOREIGN PATENT DOCUMENTS

| | | | |
|---|---|---|---|
| 2548513 | 1/1985 | France | 172/177 |
| 1020013 | 5/1983 | U.S.S.R. | 172/540 |

OTHER PUBLICATIONS

"A 'Superhighway' for Seed" by Charles Johnson, Farm Journal, Mar. 1992.

Primary Examiner—Dave W. Arola
Assistant Examiner—Christopher J. Novosad
Attorney, Agent, or Firm—Zarley, McKee, Thomte, Voorhees & Sease; Dennis L. Thomte

[57] ABSTRACT

A row cleaner comprising a pair of ground engageable finger wheels which are angled with respect to each other so they converge forwardly toward the center of their normal path of travel. Each of the finger wheels includes a central disc-shaped portion having a plurality of spaced-apart, elongated fingers extending from the circumference thereof. The longitudinal axis of each of the fingers is disposed at an angle with respect to a radius extending from the center of the disc-shaped portion to the outer end of the finger.

8 Claims, 3 Drawing Sheets

ROW CLEANER

BACKGROUND OF THE INVENTION

1. Field of the Invention

This invention relates to a row cleaner and more particularly to an improved mulch moving and soil conditioning device for use in planter and fertilizer applications.

2. Description of the Related Art

In recent years, minimum-till and no-till farming has become extremely popular in an effort to reduce soil erosion and to conserve soil moisture. However, the presence of the crop debris, commonly called residue, makes it difficult for a planter unit or a fertilizer unit to cut through the residue so that the seed and/or fertilizer is properly positioned in the soil. Many attempts have been previously made to clean the rows of residue in advance of the planter and fertilizer units. However, many of the prior art devices require some sort of cutting device which cuts through the residue. Further, various of the prior art devices do not move large pieces of mulch and clods out of the path of the following equipment. Further, many of the prior art devices do not function satisfactorily due to the fact that the teeth or fingers thereon tend to spear the residue which substantially reduces the effectiveness of the row cleaning device. For example, a row cleaner is disclosed in U.S. Pat. No. 4,785,890 which includes a plurality of spoke members which extend radially outwardly from a central hub. It is believed that the radially extending spoke members of the '890 patent tend to spear the residue which reduces the effectiveness of the device disclosed in the '890 patent. Further, it is believed that a separate cutting device is required for the device of the '890 patent to be even remotely effective. It is also believed that the device of the '890 patent leaves sizable amounts of residue in the path of the depth or gauge wheels of the planter which causes irregular seed depth.

SUMMARY OF THE INVENTION

An improved row cleaning device is disclosed which is positioned forwardly of a planter or fertilizer unit. The row cleaner of this invention includes a pair of ground engageable finger wheels which are angled with respect to each other so they converge forwardly towards the center of their normal path of travel. Each of the finger wheels includes a central disc-shaped portion which has a plurality of spaced-apart, elongated fingers extending from the circumference thereof. The longitudinal axis of each of the fingers is disposed at an angle with respect to a radius extending from the center of the disc-shaped portion to the outer end of the finger. Preferably, the longitudinal axis of each of the fingers is disposed at approximately a 31° C. angle with respect to the above-described radius although the longitudinal axis may be disposed at approximately 200°–45° with respect to the above-described radius. Each of the fingers is provided with a pointed portion at its outer end which is defined by a surface which is parallel to the wheel radius. Adjacent pairs of fingers define a generally U-shaped portion therebetween so that clods and large pieces of mulch may be received thereby.

It is therefore a principal object of the invention to provide an improved row cleaner device.

Yet another object of the invention is to provide an improved row cleaner device which employs a plurality of spaced-apart fingers which extend outwardly from the circumference of circular disc-shaped central portions with the longitudinal axis of the fingers being disposed at an angle with respect to a radius extending from the center of disc-shaped portion to the outer end of the finger.

A further object of the invention is to provide a row cleaner which does not utilize any cutting device.

Yet another object of the invention is to provide a row cleaner having improved mulch moving and soil conditioning capabilities.

Still another object of the invention is to provide a row cleaner having a plurality of spaced-apart fingers extending therefrom which are disposed in an attitude so as to reduce the tendency of the fingers to spear residue.

Still another object of the invention is to provide a row cleaner which removes the residue from the surface in the case of no-till farming and which removes the residue from the top two to three inches of the soil in the case of limited-till or minimum-tillage farming.

Yet another object of the invention is to provide a row cleaner which is economical of manufacture, durable in use and refined in appearance.

These and other objects will be apparent to those skilled in the art.

DESCRIPTION OF THE PREFERRED EMBODIMENT

Figure 2:
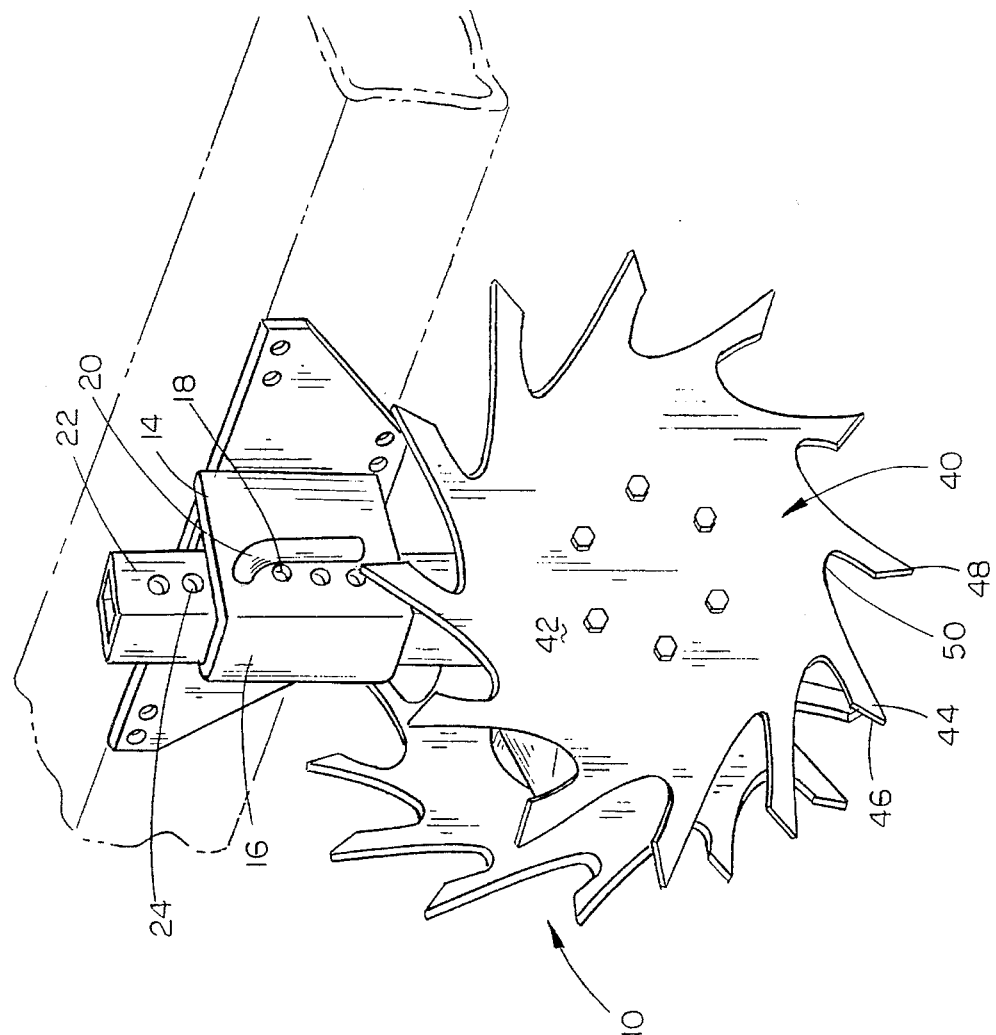
FIG. 2 is a side perspective view of the row cleaner of this invention.

The row cleaner of this invention is referred to generally by the reference numeral 10 and is designed to be mounted on a toolbar 12 or the like so as to be positioned forwardly of a conventional planter unit or fertilizer unit. The row cleaner of this invention is ideally suited for use in minimum-till and/or no-till farming operations so that the trash or residue on the ground may be moved laterally with respect to the row to enable the planter unit and/or fertilizer unit to work efficiently.

Row cleaner 10 includes a support 14 which is bolted to the toolbar 12 or the individual planter row unit.

In any event, support 14 includes a mounting plate 15 having a hollow mounting bracket or tube 16 welded to the forward end thereof. As seen in FIG. 2, bracket 16 is provided with a plurality of vertically spaced holes or openings 18 provided therein adapted to receive an adjustment pin 20.

Figure 1:
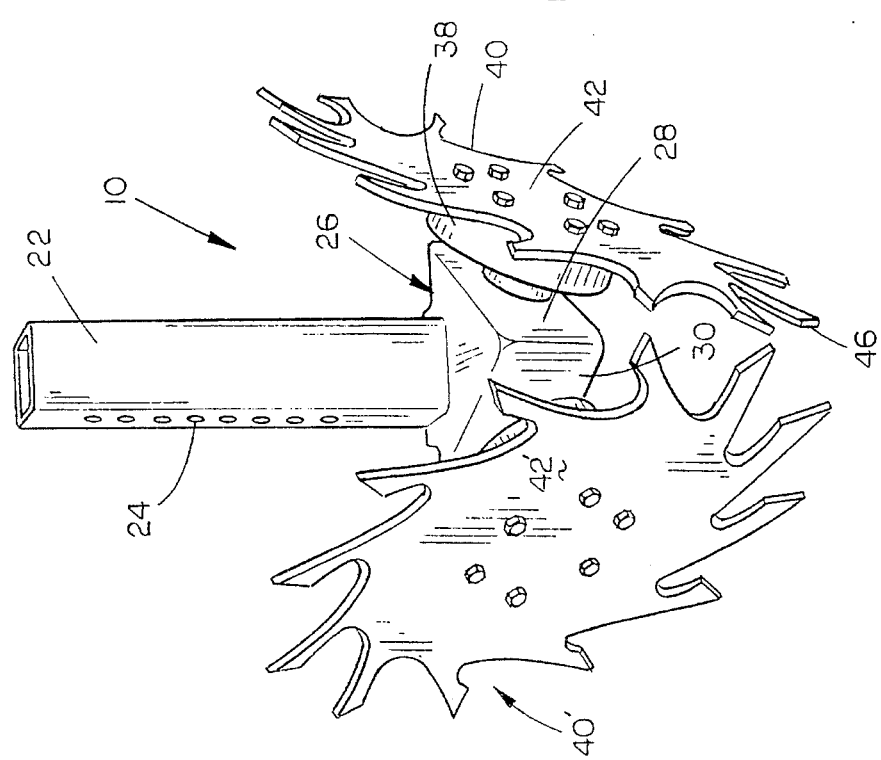
FIG. 1 is a front perspective view of the row cleaner of this invention.
Figure 3:
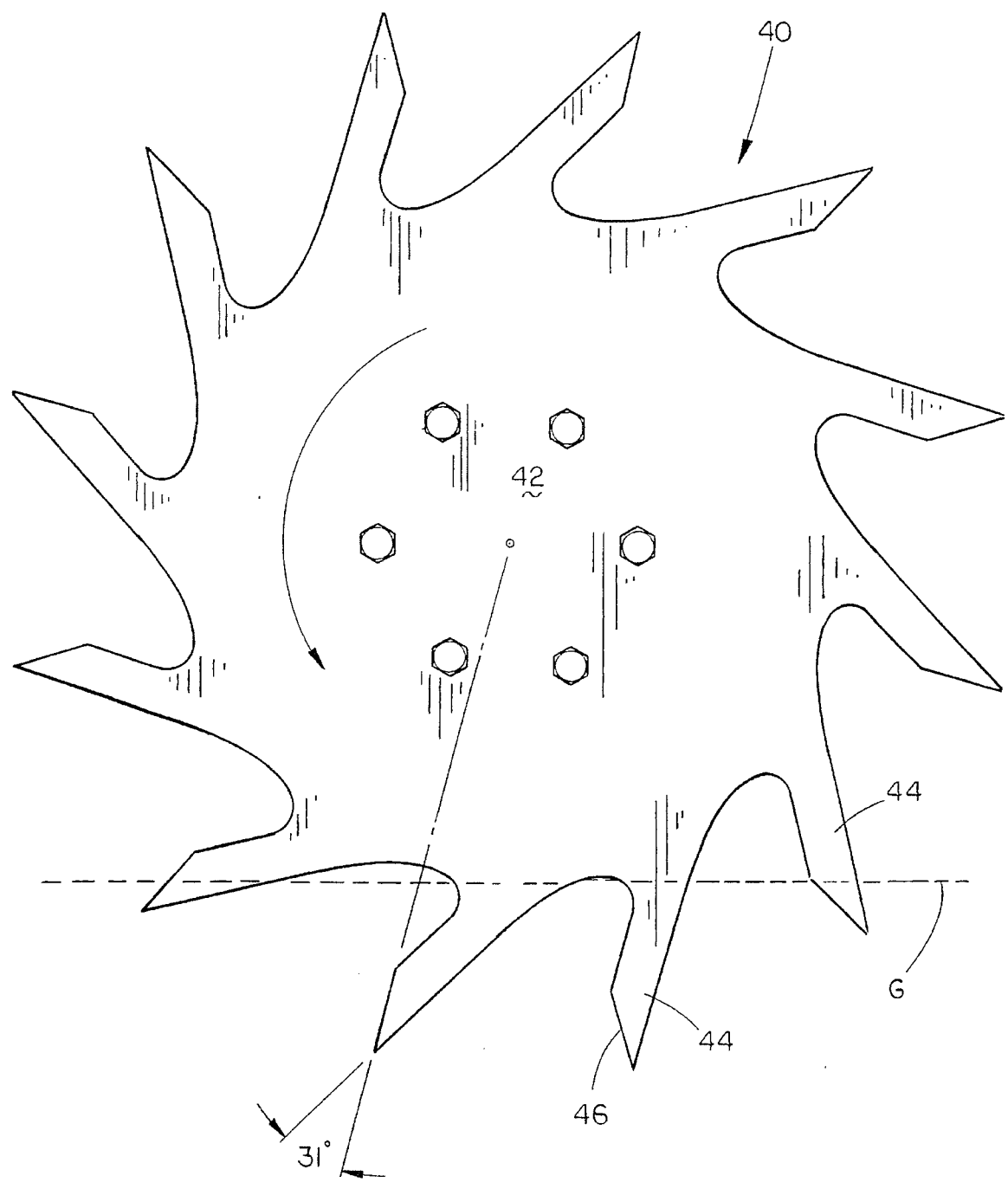
FIG. 3 is a plan view of one of the finger wheels.
Figure 4:
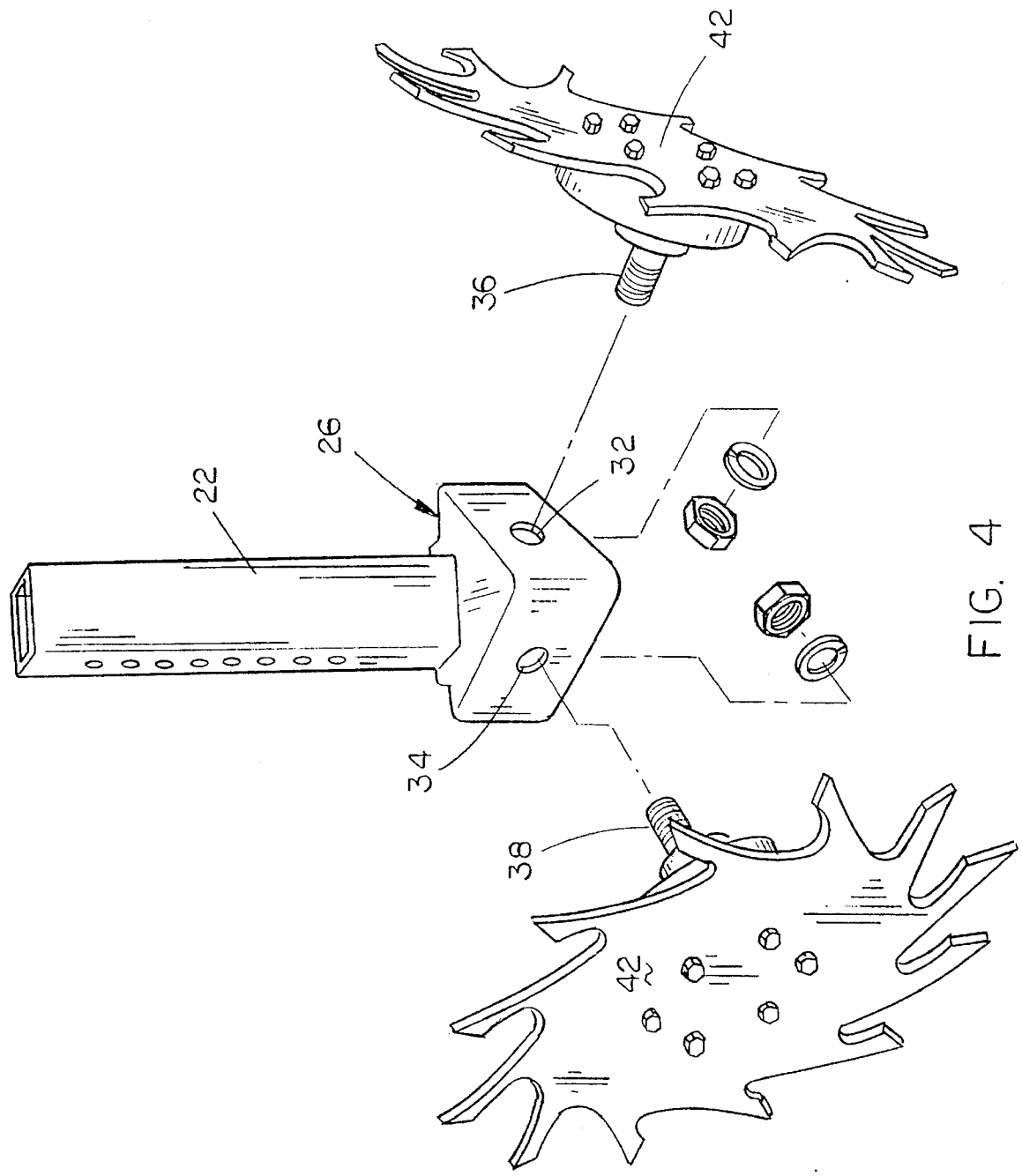
FIG. 4 is an exploded front perspective view of the row cleaner of this invention.

Row cleaner 10 includes a vertically disposed post 22 which is adapted to be selectively vertically positioned in bracket 16 as illustrated in FIG. 2. As seen in FIGS. 1 and 2, post 22 includes a plurality of vertically spaced holes or openings 24 formed therein which are adapted to register with the holes or openings 18 in bracket 16 in conventional fashion.

Blade mount 26 is welded to the lower end of post 24 and presents a pair of side portions 28 and 30 which are angled with respect to each other and which converge at their forward ends. Side portions 26 and 28 are provided with an opening 32 and 34 formed therein respectively which are adapted to receive the mounting bolts 36 and 37 of a hub and bearing assembly 38 and 38'. All of the structure described to this point is conventional in design.

The instant invention resides in the design of the finger wheels 40 and 40' which are bolted to the hub and bearing assemblies 38 and 38' respectively. Inasmuch as wheels 40 and 40' are identical, except for the fact that they are mounted as mirror images of one another, only wheel 40 will be described in detail with corresponding structure on wheel 40' being designated as "'".

Wheel 40 includes a central disc-shaped portion 42 having a plurality of openings formed therein to enable the wheel 40 to be bolted to the hub and bearing assembly 38. A plurality of spaced-apart fingers 44 extend from the circumference of disc-shaped portion 42 at an angle with respect to a radius extending from the center of the disc-shaped portion 42 to the outer end of the finger. Preferably, that angle is approximately 31°. The angle of the spaced-apart fingers, with respect to the radius above-described, may vary from 20°–45° although the preferred angle is approximately 31°. Each of the fingers 44 is provided with an angled outer end 46 which terminates in a point 48. Preferably, the outer end 46 is disposed parallel to the radius of the wheel. Adjacent pairs of fingers 42 define a generally U-shaped portion 50 therebetween.

As seen in the drawings, when the wheel 40 is mounted on the hub and bearing assembly 38, the fingers 44 at the lower end of the wheel 40 extend downwardly and forwardly into engagement with the residue and the soil. The angular displacement of the fingers 44 as described above aids in preventing the fingers 44 from spearing the residue. The angled outer ends 46 of the teeth 44 also aid in preventing the fingers from spearing residue on the ground.

In operation, the wheels 40 and 40' will penetrate the ground G and will rotate due to the fact that the implement is being moved forwardly. The angled nature of the fingers 44 tends to crumble clods and remove air pockets from the soil directly ahead of the seed opener or fertilizer device. As the fingers 44 continue their rotation downward and rearward, the fingers 44 will collect, not stab, large clods and move residual mulch in a lateral fashion with respect to the row. The collection operation removes the residue from the surface in the case of no-till farming, and combs it from the top two to three inches of the soil in the case of limited-till or conventional tillage farming.

The fingers 44 hold onto the clods and mulch and move the same sideways out of the path of the advancing seed opening or fertilizer device. Such action improves the seed to soil contact and stabilizes the planting depth, thereby improving plant emergence and population. The cleaner of this invention does not require any cutting device to function properly as is the case in many of the prior art devices. The row cleaner of this invention selectively moves large pieces of mulch and clods out of the path of the planters, drills and fertilizer equipment, while leaving pieces of mulch that are large enough to help prevent erosion, but yet so small that they will not interfere with function or accuracy of planters and fertilizer applicators.

Thus it can be seen that the invention accomplishes at least all of its stated objectives.

I claim:

1. In combination with a farm implement having rearward and forward ends and including at least one planter unit:

a row cleaner device positioned forwardly of at least one planter unit for clearing trash and dirt clods ahead of the planter unit;

said row cleaner device including a pair of ground engageable finger wheels which are angled with respect to each other so they converge forwardly toward the center of their normal path of travel;

each of said finger wheels including a central disc-shaped portion having a plurality of spaced-apart, elongated fingers extending from the circumference thereof;

each of said fingers having a longitudinal axis;

the longitudinal axis of each of said fingers being disposed at an angle with respect to a radius extending from the center of said disc-shaped portion to the outer end of each of said fingers;

each of said fingers being provided with a pointed portion at the outer end;

said pointed portion at the outer end of each of said fingers being defined by a surface which is substantially parallel to a radius extending from the center of said disc-shaped portion to the circumference thereof.

2. The combination of claim 1 wherein the longitudinal axis of each of said fingers is disposed at approximately a 31° angle with respect to the said radius.

3. The combination of claim 1 wherein adjacent pairs of fingers define a generally U-shaped portion therebetween.

4. The combination of claim 1 wherein the longitudinal axis of each of said fingers is disposed at approximately a 20°–45° angle with respect to the said radius.

5. In combination with a farm implement having rearward and forward ends and including at least one fertilizer unit:

a row cleaner device positioned forwardly of at least one fertilizer unit for clearing trash and dirt clods ahead of the planter unit;

said row cleaner device including a pair of ground engageable finger wheels which are angled with respect to each so they converge forwardly toward the center of their normal path of travel;

each of said finger wheels including a central disc-shaped portion having a plurality of spaced-apart, elongated fingers extending from the circumference thereof;

each of said fingers having a longitudinal axis;

the longitudinal axis of each of said fingers being disposed at an angle with respect to a radius extending from the center of said disc-shaped portion to the outer end of each of said fingers;

each of said fingers being provided with a pointed portion at the outer end;

said pointed portion at the outer end of each of said fingers being defined by a surface which is substantially parallel to a radius extending from the center of said disc-shaped portion to the circumference thereof.

6. The combination of claim 5 wherein the longitudinal axis of said fingers is disposed at approximately a 31° angle with respect to the said radius.

7. The combination of claim 5 wherein adjacent pairs of fingers define a generally U-shaped portion therebetween.

8. The combination of claim 5 wherein the longitudinal axis of each of said fingers is disposed at approximately a 20°–45° angle with respect to the said radius.

\* \* \* \* \*